M. QUINLIVEN & L. SADLER.
FOOD DISPENSER.
APPLICATION FILED JUNE 21, 1916.
1,221,217.
Patented Apr. 3, 1917.
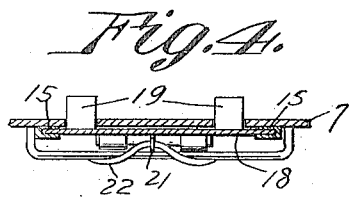
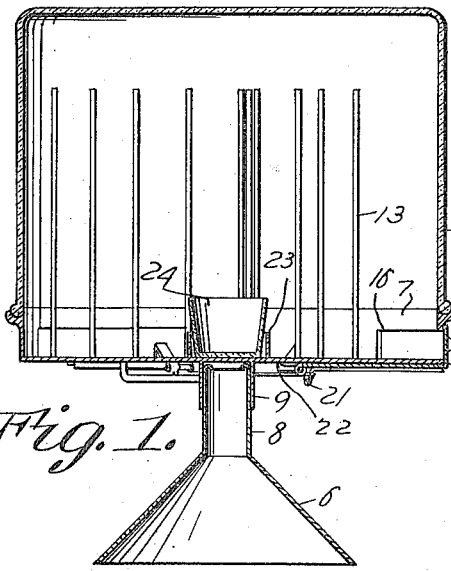
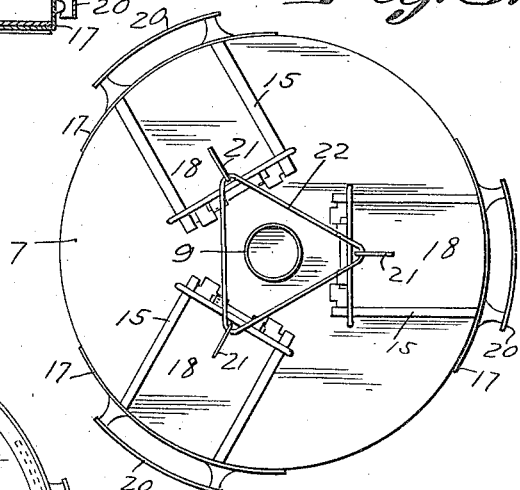
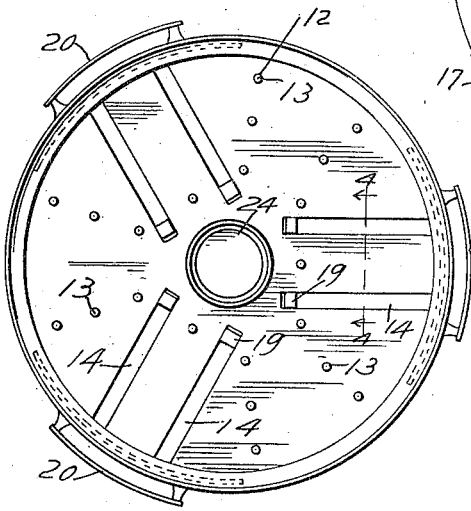
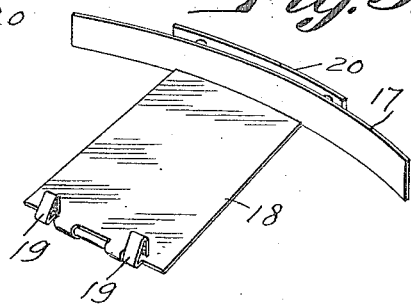
Inventors:
Matthew Quinliven
Luther Sadler,
By
Attorney

UNITED STATES PATENT OFFICE.

MATTHEW QUINLIVEN AND LUTHER SADLER, OF MIAMI, ARIZONA.

FOOD-DISPENSER.

1,221,217.  Specification of Letters Patent.  Patented Apr. 3, 1917.

Application filed June 21, 1916. Serial No. 104,943.

*To all whom it may concern:*

Be it known that we, MATTHEW QUINLIVEN and LUTHER SADLER, citizens of the United States of America, and residents of Miami, in the county of Gila and State of Arizona, have invented certain new and useful Improvements in Food-Dispensers, of which the following is a specification.

This invention relates to stands or cases designed for containing bread, cake or the like, so that slices of the same may be taken from the case without opening the said case, the said invention being designed for the protection of edibles while at the same time affording means for the delivery of the said edibles to purchasers or customers of restaurants, lunch rooms and the like.

A further object of this invention is to provide novel means whereby the manipulation of a slide will effect the delivery of a slice of bread or the like to the customer and whereby upon the return of the delivery device, the said delivery device will automatically be supplied with another slice of bread, or the like which will be delivered upon the next operation of the said delivery device.

A still further object of this invention is to provide a stand with a removable cover preferably of transparent material so that the contents of the stand may be viewed and yet protected from dust and flies.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a vertical sectional view of the stand embodying the invention;

Fig. 2 illustrates a top plan view thereof with the cover removed;

Fig. 3 illustrates an underneath plan view of the device, the base being removed;

Fig. 4 illustrates a sectional view on the line 4—4 of Fig. 2; and

Fig. 5 illustrates a perspective view of one of the delivery members.

In these drawings 6 denotes the base which may be of any ordinary construction for supporting the tray 7, the base having an upstanding portion 8 on which the tray is rotatable, said tray having a tubular downwardly extending portion 9 fitting over the upstanding portion of the base, thereby permitting the rotation of the tray for the convenience of the purchaser.

The upper edge of the tray has a shoulder 10 on which a cover 11 is fitted and the said cover, as stated, is preferably transparent so that the contents of the tray may be viewed.

The bottom of the tray has a series of apertures 12 which form seats or sockets for the posts or rods 13 and these posts are so situated as to form guides for the slices of bread or cake placed on the tray, thus insuring the approximate vertical alinement of the slices so that in their descent, they will come into proper relation to the delivery mechanism, to be hereinafter described.

The bottom of the tray is preferably provided with pairs of slots 14, 14, and the under surface of the tray has pairs of guides 15, 15, parallel with the pairs of slots. The wall of the tray has openings 16 for the reception of flanges 17 carried by a plate 18, which plate has its edges slidable in the guides 15. The plate 18 has shoulders 19 at its inner end, the said shoulders being preferably formed integral with the said plate and comprising extensions of the said plate bent as shown in the drawing to stand approximately vertically with relation to the upper surface of the plate, and the said shoulders are intended for the engagement of slices of bread or the like which are to be drawn from the casing when the plate is moved outwardly by a purchaser or operator. The outer end of the plate is supplied with a handle 20 to facilitate its manipulation and as the plate is drawn outward, the slices of bread or the like will lie on the plate between the shoulders 19 and the flange 17, so that it can be removed by the purchaser.

The under surface of each sliding plate is provided with a downwardly extending lug or pin 21 formed by securing a strip of metal to the under surface of the said slide and bending its ends downwardly so that it may engage the resilient member 22 which may be in the nature of an elastic band or spring, and as shown in Fig. 3, where there is a plurality of plates or sliding members, a plurality of lugs may be engaged by a resilient member so that the structure is simplified, as compared with a structure in which a resilient member is supplied for each sliding member.

The upper surface of the tray is also provided with a seat 23 for a receptacle 24 which may contain liquid so that proper supply of moisture within the tray and cover will prevent the contents of the tray from becoming dry.

As stated, the tray is swiveled or rotatable with relation to the base and standard and, therefore, the tray may contain different kinds of bread or the like and a customer may turn the stand so that he may select the commodity he wishes to purchase or have delivered to him.

We claim—

In a food dispenser, a base, a tray rotatably mounted therein, said tray having slots in its bottom, plates slidably mounted with relation to the tray having shoulders projecting through the slots, lugs extending downwardly from the said slides, a resilient member connecting the lugs of the several slides for exerting a pull on the said slides to return them to their normal positions, and means on the tray for holding materials in position to be engaged by the shoulders of the plates.

MATTHEW QUINLIVEN.
LUTHER SADLER.

Copies of this patent may be obtained for five cents each, by addressing the "Commissioner of Patents, Washington, D. C."